United States Patent
Chung et al.

(10) Patent No.: US 11,610,246 B2
(45) Date of Patent: *Mar. 21, 2023

(54) PRODUCT AND CONTENT ASSOCIATION

(71) Applicant: Transform SR Brands LLC, Hoffman Estates, IL (US)

(72) Inventors: Eui Chung, Huntley, IL (US); Bharath Sridharan, Glendale Heights, IL (US); Seyed Alireza Forouzan Ebrahimi, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,274

(22) Filed: Sep. 10, 2021

(65) Prior Publication Data
US 2021/0406975 A1  Dec. 30, 2021

Related U.S. Application Data

(63) Continuation of application No. 16/673,365, filed on Nov. 4, 2019, now Pat. No. 11,127,063, which is a continuation of application No. 14/104,070, filed on Dec. 12, 2013, now abandoned.

(51) Int. Cl.
*G06Q 30/06* (2012.01)
*G06F 16/951* (2019.01)
(Continued)

(52) U.S. Cl.
CPC ... *G06Q 30/0627* (2013.01); *G06F 16/24578* (2019.01); *G06F 16/951* (2019.01); *G06Q 30/0601* (2013.01)

(58) Field of Classification Search
CPC ............... G06Q 30/02; G06Q 30/0251; G06Q 30/0277; G06K 9/627
(Continued)

(56) References Cited

U.S. PATENT DOCUMENTS 9,489,449 B1 * 11/2016 Scholl .................. G06F 16/313
2005/0065909 A1 * 3/2005 Musgrove .......... G06Q 30/0603
(Continued)

FOREIGN PATENT DOCUMENTS

WO  2010085773 A1  7/2010
WO  WO-2010085773 A1 * 7/2010 ............. G06Q 30/00

OTHER PUBLICATIONS

Eric Enge, Using Term Frequency Analysis To Measure Your Content Quality, Apr. 15, 2015, Moz.com, Moz.com/blog/using-term-frequency-analysis-to-measure-content-quality, pp. 1-19 (Year: 2015).*

(Continued)

*Primary Examiner* — Joy Chng
(74) *Attorney, Agent, or Firm* — McAndrews Held & Malloy, Ltd.

(57) ABSTRACT

Methods and apparatus are disclosed regarding an e-commerce system that maintains references between products and relevant content. In some embodiments, methods and/or apparatus obtain content from one or more content providers via a computer network, identify a product from a product catalog of an electronic database that is related to the obtained content; and update references to relevant content maintained in an electronic database for the product to include a reference to the obtained content.

20 Claims, 6 Drawing Sheets

(51) Int. Cl.
  *G06F 16/2457* (2019.01)
  *G06Q 30/0601* (2023.01)
(58) Field of Classification Search
  USPC .................................................. 705/26, 63
  See application file for complete search history.

(56) References Cited

U.S. PATENT DOCUMENTS

2005/0154746 A1* 7/2005 Liu .................... G06F 16/3326
2012/0078731 A1* 3/2012 Linevsky ........... G06Q 30/0643
                                                    705/26.81

OTHER PUBLICATIONS

Apache OpenNLP, Apache Software Foundation, dated Nov. 27, 2013, 1 page.
Latent Dirichlet Allocation, Wikipedia, the free encyclopedia, dated Nov. 27, 2013, 9 pages.
The Stanford NLP (Natural Language Processing) Group, nlp.standord.edu, dated Nov. 27, 2013, 4 pages.
Chebyshev Distance, Wikipedia, the free encyclopedia, dated Nov. 27, 2013, 3 pages.
Jaccard Index, Wikipedia, the free encyclopedia, dated Nov. 27, 2013, 5 pages.
RSS, Wikipedia, the free encyclopedia, dated Nov. 26, 2013, 8 pages.
Euclidean Distance, Wikipedia, the free encyclopedia, dated Nov. 27, 2013, 3 pages.
Mexican Office Action re MX/a/2014/015348, dated May 24, 2016 (7 pages).
Extended European Search Report for EP14197661.3, dated Apr. 28, 2015 (5 pages).
Notification of a Requisition by the Examiner in Canadian Application No. 2874614, dated Jan. 13, 2021. (5 pages).

\* cited by examiner

PRODUCT AND CONTENT ASSOCIATION

RELATED APPLICATIONS

The present application is a continuation of U.S. application Ser. No. 16/673,365, filed Nov. 4, 2019, which is a continuation of U.S. application Ser. No. 14/104,070, filed Dec. 12, 2013, the disclosures of which are hereby incorporated by reference in their entirety.

FIELD OF THE INVENTION

Various embodiments relate to electronic commerce (e-commerce), and more particularly, to providing information for products sold in an e-commerce environment.

BACKGROUND OF THE INVENTION

Electronic commerce (e-commerce) websites are an increasingly popular venue for consumers to research and purchase products without physically visiting a conventional brick-and-mortar retail store. An e-commerce website may provide a vast array of products and/or services which customers may purchase from the website. In order to aid the customer in making informed purchase decisions, the e-commerce website may maintain and present to its customers various types of information about each offered product and/or service such as, for example, technical specifications, pictures, video demonstrations, customer reviews, etc.

A vast amount of information for any given product or service may be generally found on the Internet. In particular, various websites regularly feature in-depth product reviews, product commentaries, product comparisons, purchasing advice for product categories, product demonstrations, etc. that may aid a customer in making a purchasing decision. However, many customers may not have the time, desire, and/or ability to find the most relevant information for products of interest. Accordingly, an e-commerce website, that is able to readily provide such information, may provide a service that may both drive sales as well as increase customer loyalty.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of associating products with relevant content are shown in and/or described in connection with at least one of the figures, and are set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention are related to associating relevant content to products offered by an e-commerce site. More specifically, certain embodiments of the present invention relate to apparatus, hardware and/or software systems, and associated methods that analyze content from a plurality of content providers and associate products of an e-commerce site with relevant content based on such analysis.

Figure 1:
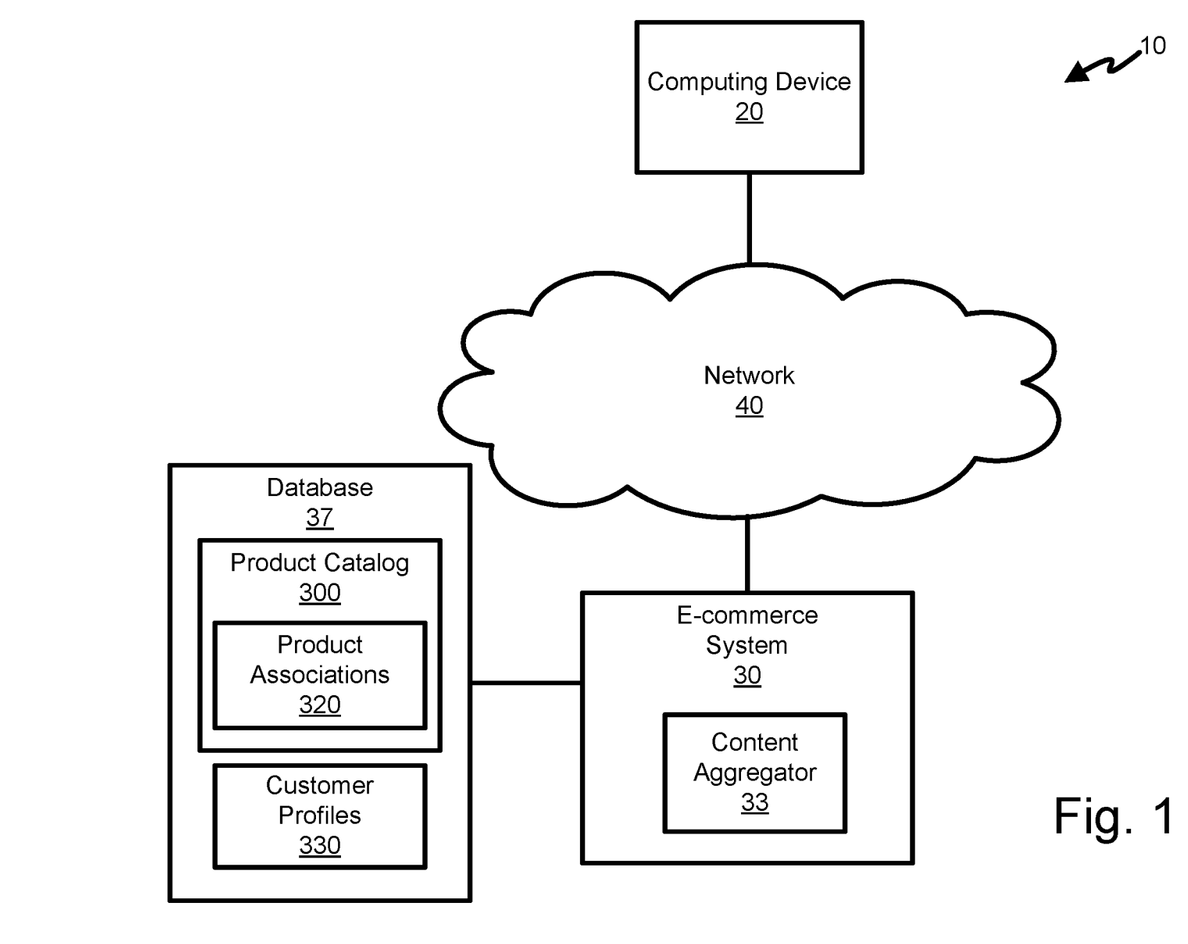
FIG. 1 shows an e-commerce environment comprising a computing device and an e-commerce system in accordance with an embodiment of the present invention.

Referring now to FIG. 1, an e-commerce environment 10 is depicted. As shown, the e-commerce environment 10 may include a computing device 20 connected to an e-commerce system 30 via a computer network 40. The network 40 may include a number of private and/or public networks such as, for example, wireless and/or wired LAN networks, cellular networks, and the Internet that collectively provide a communication path and/or paths between the computing device 20 and the e-commerce system 30. The computing device 20 may include a desktop, a laptop, a tablet, a smart phone, and/or some other type of computing device which enables a user to communicate with the e-commerce system 30 via the network 40. The e-commerce system 30 may include one or more web servers, database servers, routers, load balancers, and/or other computing and/or networking devices that operate to provide an e-commerce experience for users that connect to the e-commerce system 30 via the computing device 20 and the network 40.

The e-commerce system 30 may further include a content aggregator 33 and one or more electronic databases 37 configured to store data used by the content aggregator 33 such as product catalog 300, product associations 320, and customer profiles 330. The content aggregator 33 may include one or more firmware and/or software instructions, routines, modules, etc. that the e-commerce system 30 may execute in order to extract content from one or more content providers and associate the extracted content with appropriate products and/or services provided by the e-commerce system 30. Further details regarding the content aggregator 33 are presented below with respect to FIGS. 5 and 6.

FIG. 1 depicts a simplified embodiment of the e-commerce environment 10 which may be implemented in numerous different manners using a wide range of different computing devices, platforms, networks, etc. Moreover, while aspects of the e-commerce environment 10 may be implemented using a client/server architecture, aspects of the e-commerce may be implemented using a peer-to-peer architecture or another networking architecture.

Figure 2:
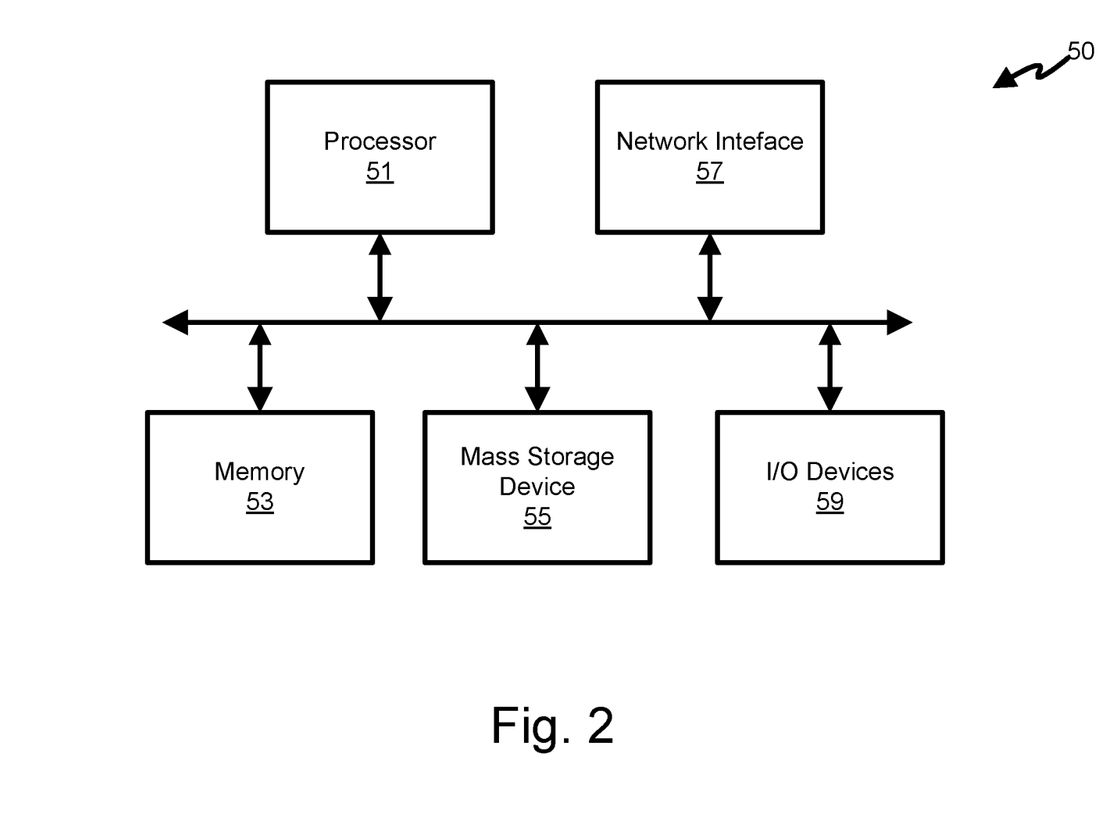
FIG. 2 shows an embodiment of a computing device for use in the e-commerce environment of FIG. 1.

As noted above, the e-commerce system 30 may include one or more computing devices. FIG. 2 depicts an embodiment of a computing device 50 suitable for the computing device 20 and/or the e-commerce system 30. As shown, the computing device 50 may include a processor 51, a memory 53, a mass storage device 55, a network interface 57, and various input/output (I/O) devices 59. The processor 51 may be configured to execute instructions, manipulate data and generally control operation of other components of the computing device 50 as a result of its execution. To this end, the processor 51 may include a general purpose processor such as an x86 processor or an ARM processor which are available from various vendors. However, the processor 51 may also be implemented using an application specific processor and/or other logic circuitry.

The memory 53 may store instructions and/or data to be executed and/or otherwise accessed by the processor 51. In some embodiments, the memory 53 may be completely and/or partially integrated with the processor 51.

In general, the mass storage device 55 may store software and/or firmware instructions which may be loaded in memory 53 and executed by processor 51. The mass storage device 55 may further store various types of data which the processor 51 may access, modify, and/otherwise manipulate in response to executing instructions from memory 53. To this end, the mass storage device 55 may comprise one or more redundant array of independent disks (RAID) devices, traditional hard disk drives (HDD), solid-state device (SSD) drives, flash memory devices, read only memory (ROM) devices, etc.

The network interface 57 may enable the computing device 50 to communicate with other computing devices directly and/or via network 40. In particular, the network interface 57 may permit the processor 51 to obtain content from content providers via network 40. To this end, the networking interface 57 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computing device 50 and network 40 and/or another computing device.

Finally, the I/O devices 59 may generally provide devices which enable a user to interact with the computing device 50 by either receiving information from the computing device 50 and/or providing information to the computing device 50. For example, the I/O devices 59 may include display screens, keyboards, mice, touch screens, microphones, audio speakers, etc.

While the above provides general aspects of a computing device 50, those skilled in the art readily appreciate that there may be significant variation in actual implementations of a computing device. For example, a smart phone implementation of a computing device may use vastly different components and may have a vastly different architecture than a database server implementation of a computing device. However, despite such differences, computing devices generally include processors that execute software and/or firmware instructions in order to implement various functionality. As such, aspects of the present application may find utility across a vast array of different computing devices and the intention is not to limit the scope of the present application to a specific computing device and/or computing platform beyond any such limits that may be found in the appended claims.

Figure 3:
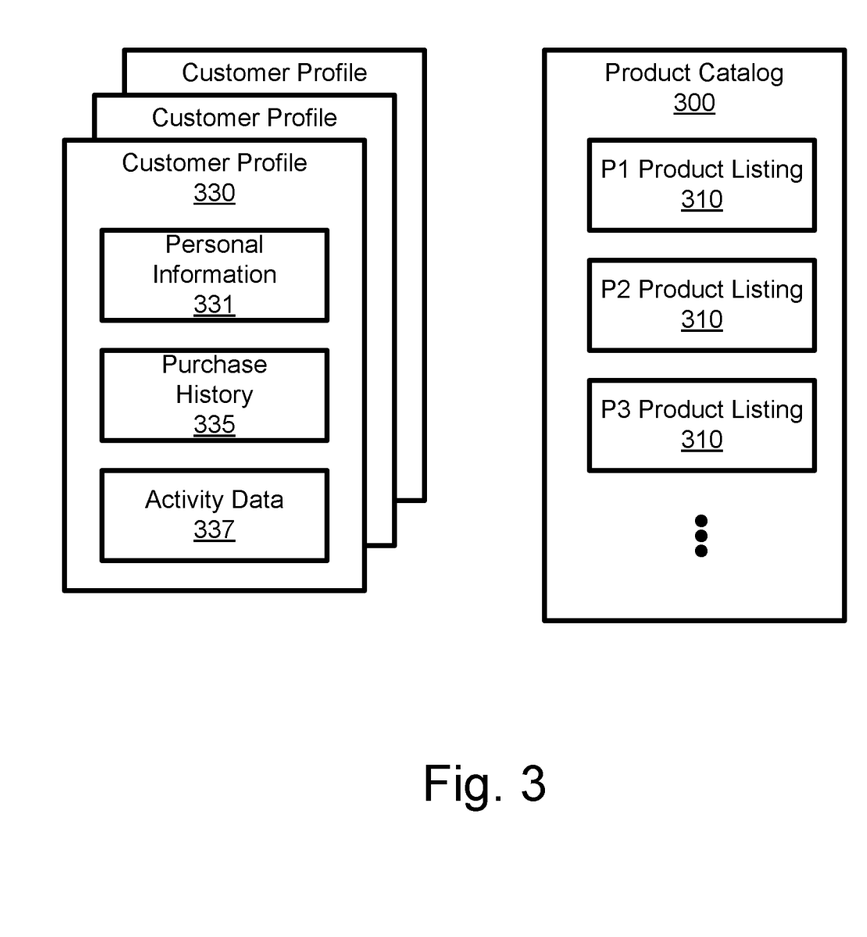
FIG. 3 shows user profiles and a product catalog maintained by an e-commerce system of FIG. 1.

As part of the provided e-commerce experience, the e-commerce system 30 may enable customers, which may be guests or members of the e-commerce system 30, to browse and/or otherwise locate products. The e-commerce system 30 may further enable such customers to purchase products and/or services offered for sale. To this end, the e-commerce system 30 may maintain an electronic database or catalog 300 which may be stored on an associated mass storage device 55. As shown in FIG. 3, the catalog 300 may include listings 310 for each product and/or service available for purchase. Each listing 310 may include various information or attributes regarding the respective product and/or service, such as a unique product identifier (e.g., stock-keeping unit "SKU"), a product description, product image(s), manufacture information, available quantity, price, product features, etc. Moreover, while the e-commerce system 30 may enable guests to purchase products and/or services without registering and/or otherwise signing-up for a membership, the e-commerce system 30 may provide additional and/or enhanced functionality to those users that become a member.

To this end, the e-commerce system 30 may enable members to create a customer profile 330. As shown, a customer profile 330 may include personal information 331, purchase history data 335, and other customer activity data 337. The personal information 331 may include such items as name, mailing address, email address, phone number, billing information, clothing sizes, birthdates of friends and family, etc. The purchase history data 335 may include information regarding products previously purchased by the customer from the e-commerce system 30. The customer history data 335 may further include products previously purchased from affiliated online and brick-and-mortar vendors.

The other customer activity data 337 may include information regarding prior customer activities such as products for which the customer has previously searched, products for which the customer has previously viewed, products for which the customer has provide comments, products for which the customer has rated, products for which the customer has written reviews, etc. and/or purchased from the e-commerce system 30. The other customer activity data 337 may further include similar activities associated with affiliated online and brick-and-mortar vendors.

Figure 4:
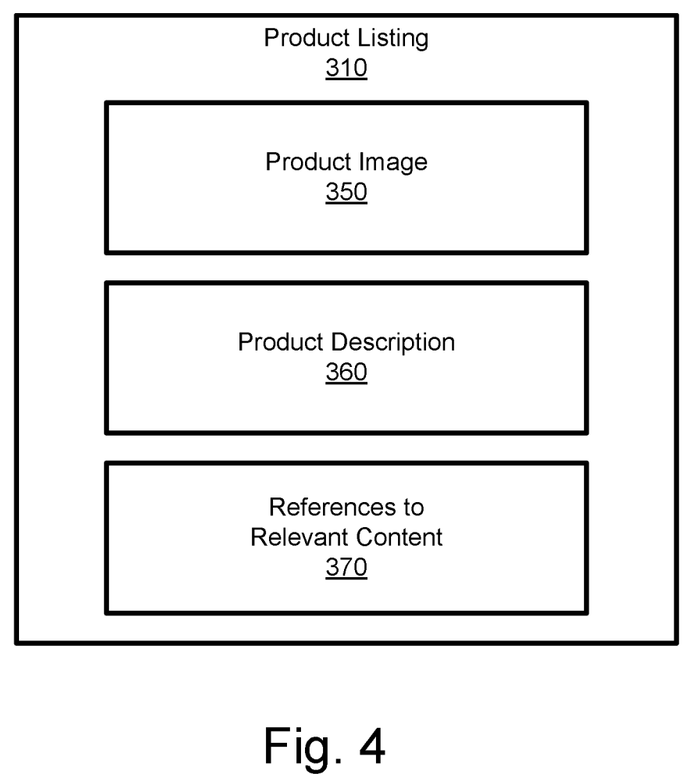
FIG. 4 shows an embodiment of a product listing provided by the e-commerce system of FIG. 1.

As part of the e-commerce experience, the e-commerce system 30 may cause a computing device 10 to display a product listing 310 as shown in FIG. 4. In particular, the e-commerce system 30 may provide such a product listing 310 in response to a member browsing products by type, price, kind, etc., viewing a list of products obtained from a product search, and/or other techniques supported by the e-commerce system 30 for locating products of interest. As shown, the product listing 310 may include one or more representative images 350 of the product as well as a product description 360. The product listing 310 may further include one or more hyperlinks and/or other references 370 to additional information associated with the product and/or service. In particular, the content aggregator 33 may analyze content provided by many different content providers such as websites, blogs, etc., identify which content is relevant to a particular product, and associate the relevant content to the product.

Figure 5:
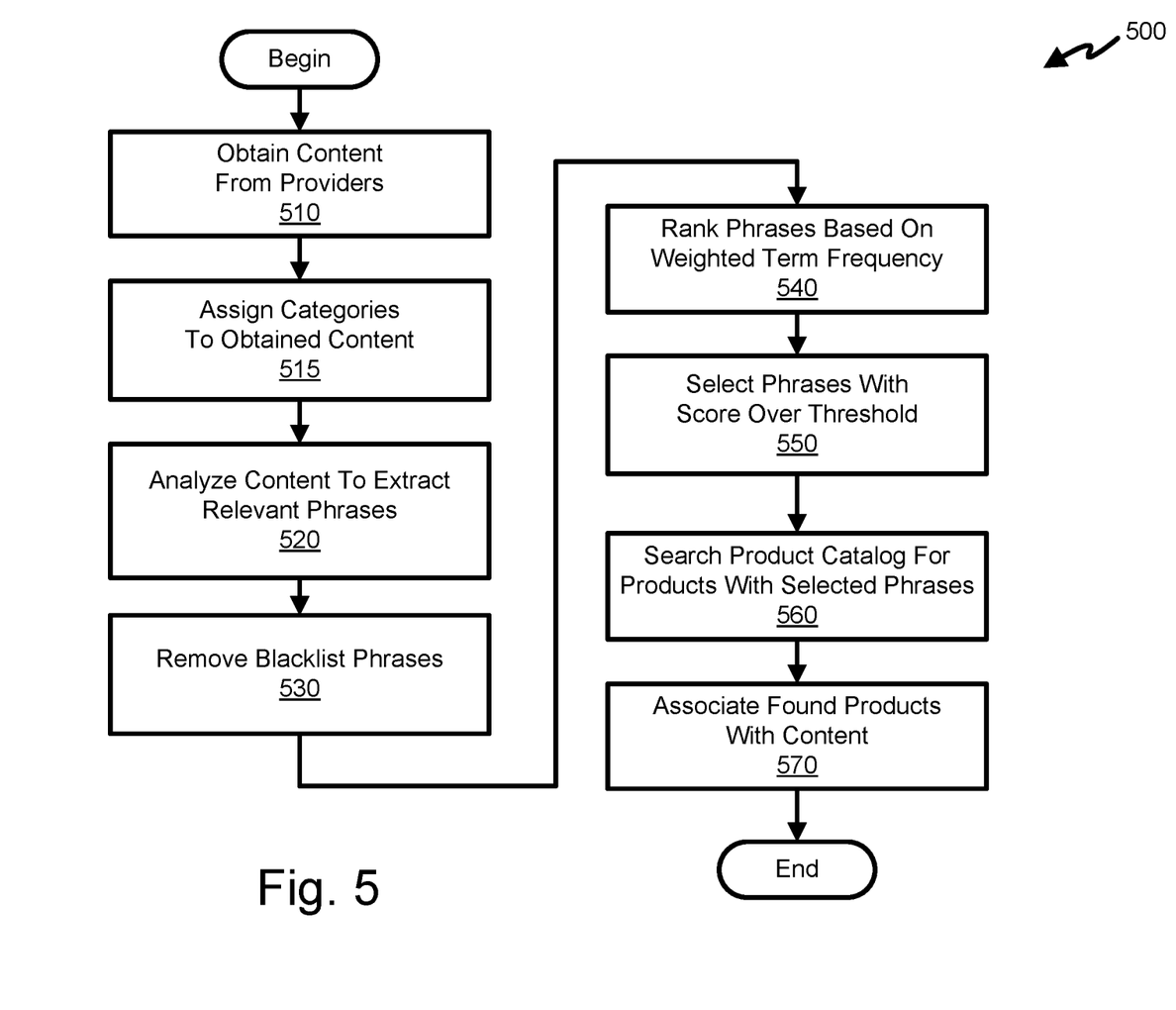
FIG. 5 shows a flowchart for an embodiment of an example process that may be used by the e-commerce system of FIG. 1 to associate content with a product.

Referring now to FIG. 5, an example method 500 is shown that may be used by the content aggregator 33 to analyze content and associate such content with products. At 510, the content aggregator 33 may obtain or otherwise collect content from various content providers on the Internet. In particular, the content aggregator 33 may subscribe to various RSS (Rich Site Summary) or (Really Simply Syndication) feeds in order to receive RSS documents from such RSS feeds. A content provider such as a website may provide RSS feeds to publish RSS documents for frequently updated information of the website such as, for example, blog entries, news headlines, audio, and video. The RSS documents received by the content aggregator 33 may include full text or summarized text of the updated content and may further include metadata for the updated content such as publishing date and author's name. Thus, by subscribing to various RSS feeds, the content aggregator 33 may automatically receive RSS documents from publishers without requiring the content aggregator 33 to poll or otherwise periodically check the content of the corresponding content provider.

Besides RSS feeds, the content aggregator 33 may obtain further content by polling websites of interests for relevant content. To this end, the content aggregator 33 may maintain a list of websites to periodically check for new content. The content aggregator 33 may then crawl or traverse such websites for content in a manner similar to webcrawlers used by web search engines.

At 515, the content aggregator 33 may assign categories to content obtained at 510. For example, the content aggregator 33 may assign a category or categories to each received RSS document based on its URL (Universal Resource Locator), title of the content, main text of the content, etc. In particular, the content aggregator 33 may maintain a list of categories for the products of the product catalog 300 and categorize such RSS documents accordingly.

The content aggregator 33 at 520 may analyze the content to extract relevant phrases. For example, the content aggregator 33 may extract the main text of the obtained content using various classification algorithms, shallow text processing, metadata parsing, etc. The content aggregator 33 may further use the Stanford Named Entity Recognizer (SNER), the OpenNLP library, and/or other natural language processing techniques to extract relevant phrases from the obtained content. In particular, the content aggregator 33 may use SNER to label sequences of words in the content which are the names of things, such as person, organizations, company names, and/or locations. The content aggregator 33 may further use the OpenNLP natural language processor to perform tokenization, sentence segmentation, part-of-speech tagging, named entity extraction, chunking, and parsing of the obtained content. In particular, the content aggregator 33 at 520 via such tools may extract trademark product names from the content in order to better ascertain to which products of the product catalog 300 that the obtained content relates.

The content aggregator 33 at 520 may further look for entities not extracted by the SNER or OpenNLP tools. To this end, the content aggregator 33 may maintain a list of names, phrases, etc. to match against the obtained content in order to determine whether such content includes such names, phrases, etc.

Conversely, the content aggregator 33 at 530 may remove blacklisted phrases from phrases obtained at 520. To this end, the content aggregator 33 may maintain a list of names, phrases, etc. and remove such names, phrases, etc. from the phrases extracted at 520. In this manner, a technician or other employee may tweak and fine tune the results of the phrase extraction by removing phrases that routine provide false associations between content and products.

At 540, the content aggregator 33 may rank the remaining phrases based on a weighted term frequency. In particular, the content aggregator 33 may rank the remaining phrases not only upon the frequency of such phrases occur in the content but also on the position of such phrases in the content. For example, the content aggregator 33 may give terms used in the title of the content the greatest weight, terms used in the first paragraph the next greatest weight, etc. The content aggregator 33 may further affect the weight of a term based on how often the term appeared in other documents.

The content aggregator 33 at 550 may select phrases with a score greater than a threshold level. To this end, the content aggregator 33 may sort the phrases based on their weighted term frequency scores. The content aggregator 33 may then select all such phrases greater than a specified minimum threshold score or may select the top specified percentage (e.g. the top 20%) of phrases in the sorted list.

After 550, the content aggregator 33 now has a list of phrases which are likely the most relevant phrases for the content. The content aggregator 33 then at 560 searches through the product catalog 300 to identify products which match the selected phrases. Using the metadata of the article and products (ex. Category), the content aggregator 33 may remove irrelevant products. Upon finding a match, the content aggregator 33 at 570 may update the product associations 320 of the product catalog 300 to include a reference (e.g., a hyperlink with descriptive link text) to the content. In this manner the content aggregator 33 may automatically collect lists of references 320 to relevant content for its products in the product catalog 300.

Figure 6:
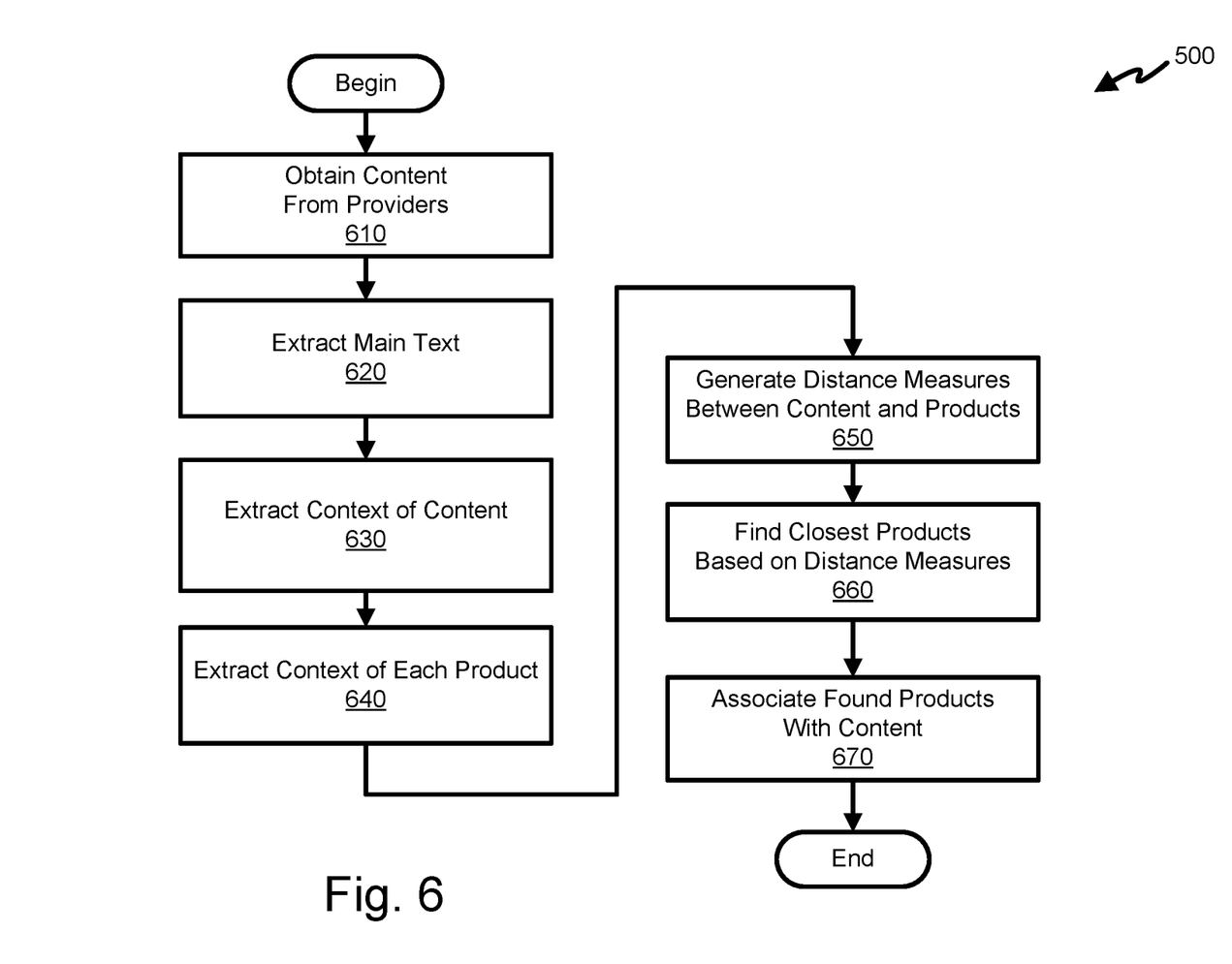
FIG. 6 shows a flowchart for an embodiment of another example process that may be used by the e-commerce system of FIG. 1 to associate content with a product.

Referring now to FIG. 6, another example method 600 is shown that may be used by the content aggregator 33 to analyze content and associate such content with products. At 610, the content aggregator 33 may obtain or otherwise collect content from various content providers on the Internet. In particular, the content aggregator 33 may obtain such content via RSS feeds, polling, and/or crawling in a manner similar to that described above in regard to step 510 of process 500.

At 620, the content aggregator 33 may extract the main text of the obtained content using various classification algorithms, shallow text processing, metadata parsing, etc. The content aggregator 33 then at 630 may analyze the content to extract the context of the content. For example, the content aggregator 33 may extract the context of the content using a natural language processing technique such as, for example, Latent Dirichlet Allocation (LDA) using a set of topics or categories such as, for example, Wikipedia tags. As a result of such processing, the content aggregator may express the context of each obtained document as a sparse probability distribution over the set of topics.

At 640, the content aggregator 33 may extract the context of each product in the product catalog 300. In particular, the content aggregator 33 may extract such context in a manner similar to that used at 630 to extract the context of the content. For example, the content aggregator 33 may use LDA natural language and Wikipedia tags to obtain for each product a sparse probability distribution of its product listing 310 over the Wikipedia tags.

Using the extracted contexts, the content aggregator 33 at 650 may generate distance measures between the probability distributions of the content and each product of the catalog 300. The content aggregator 33 may use various distance measures such as Euclidean distance, Chebschev distance, Jaccard's distance, etc. to obtain such distance measures.

Based on such distance measures, the content aggregator 33 at 660 may determine to which products that the content is most related. In particular, the content aggregator 33 may select the product with the smallest distance, the products with the smallest distances, and/or the products with a distance smaller than a threshold distance. The content aggregator 33 may also sort the products based on their distance measures, and select a predefined percentage of the products having the smallest distance measures.

The content aggregator 33 then at 670 may update the product associations 320 for the selected products to include a reference (e.g., a hyperlink with descriptive link text) to the content. In this manner the content aggregator 33 may automatically collect lists of references 320 to relevant content for its products in the product catalog 300.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices identifying relevant content for a particular product or service and associating the relevant content with the product or service.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. For example, while the above processes was described primarily from the standpoint of associating products with relevant textual content, similar processes may also be used to associate products with non-textual content (e.g., pictures, videos, audio, etc.) using similar analytical techniques to analyze metadata associated with the non-textual content and/or to analyze the non-textual content itself to determine its contextual relevance. Therefore, it is intended that the present invention not be limited to the particular embodiment or embodiments disclosed, but that the present invention encompasses all embodiments falling within the scope of the appended claims.

What is claimed is:

1. A method comprising:
    receiving, with one or more computing devices, items of content from a plurality of content providers via a network interface of the one or more computing devices;
    updating, with the one or more computing devices, an electronic database to include one or more content references that associate one or more products of a product catalog to one or more relevant items of the received items of content;
    in response to a request for a product listing for a particular product from the product catalog,
        retrieving, with the one or more computing devices, the product listing for the particular product and a set of stored content references associated with the particular product;
        presenting the product listing for the particular product and one or more stored content references from the set of stored content references; and
        in response to activation of a stored content reference of the one or more stored content references, presenting the relevant item identified by the stored content reference retrieved from a content provider of the plurality of content providers that serves the relevant item.

2. The method of claim 1, further comprising:
    extracting phrases from the received items;
    generating frequency scores for the phrases extracted from the received items based on frequency of the phrases in the received items; and
    determining, based on the phrases extracted from the received items and their frequency scores, to which products in the product catalog the received items are relevant.

3. The method of claim 2, wherein generating the frequency scores further weights the phrases based on position of the phrases in the received items.

4. The method of claim 2, further comprising removing blacklisted phrases from the phrases extracted from the received items prior to generating the frequency scores for the received items.

5. The method of claim 1, further comprising:
    subscribing to a really simply syndication (RSS) feed of a content provider of the plurality of content providers; and
    wherein receiving items from the plurality of content providers includes receiving items published via the RSS feed.

6. The method of claim 1, wherein receiving items from the plurality of content providers comprises crawling a content provider of the plurality of content providers to locate items of content served by the content provider.

7. The method of claim 1, wherein receiving items from the plurality of content providers comprises periodically polling a content provider of the plurality of content providers.

8. A non-transitory computer readable medium, comprising instructions, that in response to being executed, cause one or more computing devices to:
    receive, with one or more computing devices, items of content from a plurality of content providers via a network interface of the one or more computing devices;
    update, with the one or more computing devices, an electronic database to include one or more content references that associate one or more products of a product catalog to one or more relevant items of the received items of content;
    in response to a request for a product listing for a particular product from the product catalog,
        retrieve, with the one or more computing devices, the product listing for the particular product and a set of stored content references associated with the particular product;
        present the product listing for the particular product and one or more stored content references from the set of stored content references; and
        in response to activation of a stored content reference of the one or more stored content references, presenting the relevant item identified by the stored content reference retrieved from a content provider of the plurality of content providers that serves the relevant item.

9. The non-transitory computer readable medium of claim 8, wherein the instructions, in response to being executed, cause the one or more computing devices to:
    extract phrases from the received items;
    generate frequency scores for the phrases extracted from the received items based on frequency of the phrases in the received items; and
    determine, based on the phrases extracted from the received items and their frequency scores, to which products in the product catalog the received items are relevant.

10. The non-transitory computer readable medium of claim 9, wherein the instructions, in response to being executed, cause the one or more computing devices to generate the frequency scores the received items by further weighting the phrases based on position of the phrases in the received items.

11. The non-transitory computer readable medium of claim 9, wherein the instructions, in response to being executed, cause the one or more computing devices to remove blacklisted phrases from the phrases extracted from the received items prior to generating the frequency scores for the received items.

12. The non-transitory computer readable medium of claim 8, wherein the instructions, in response to being executed, cause the one or more computing devices to:
    subscribe to a really simply syndication (RSS) feed of a content provider of the plurality of content providers; and
    receive items from the content provider of the plurality of content provides via the RSS feed.

13. The non-transitory computer readable medium of claim 8, wherein the instructions, in response to being executed, cause the one or more computing devices to crawl a content provider of the plurality of content providers to locate items served by the content provider.

14. The non-transitory computer readable medium of claim 8, wherein the instructions, in response to being executed, cause the one or more computing devices to periodically poll a content provider of the plurality of content providers.

15. A computing system, comprising
    a network interface;
    an electronic database comprising a product catalog having a plurality of product listings for a plurality of products; and
    a processor, wherein execution of instructions stored in a memory of the computing system, causes the processor to:
        receive, via the network interface, items of content from a plurality of content providers via a network coupled to the one or more computing devices;
        update the electronic database to include one or more content references that associate one or more products of a product catalog to one or more relevant items of the received items of content;
        in response to a request for a product listing for a particular product from the product catalog,
            retrieve the product listing for the particular product and a set of stored content references associated with the particular product;
            present the product listing for the particular product and one or more stored content references from the set of stored content references; and
        in response to activation of a stored content reference of the one or more stored content references, present the relevant item identified by the stored content reference retrieved from a content provider of the plurality of content providers that serves the relevant item.

16. The computing device of claim 15, wherein execution of the instructions causes the processor to:
    extract phrases from the received items;
    generate frequency scores for the phrases extracted from the received items based on frequency of the phrases in the received items; and
    determine, based on the phrases extracted from the received items and their frequency scores, to which products in the product catalog the received items are relevant.

17. The computing device of claim 16, wherein execution of the instructions causes the processor to remove blacklisted phrases from the phrases extracted the received items prior to generating the frequency scores for the received items.

18. The computing device of claim 15, wherein execution of the instructions causes the processor to:
    subscribe to a really simply syndication (RSS) feed of a content provider of the plurality of content providers; and
    receive items from the content provider of the plurality of content providers via the RSS feed.

19. The computing device of claim 15, wherein execution of the instructions causes the processor to crawl, via the network interface, a content provider of the plurality of content providers to locate items served by the content provider.

20. The computing device of claim 15, wherein execution of the instructions causes the processor to periodically poll, via the network interface, a content provider of the plurality of content providers for items.

\* \* \* \* \*